UNITED STATES PATENT OFFICE.

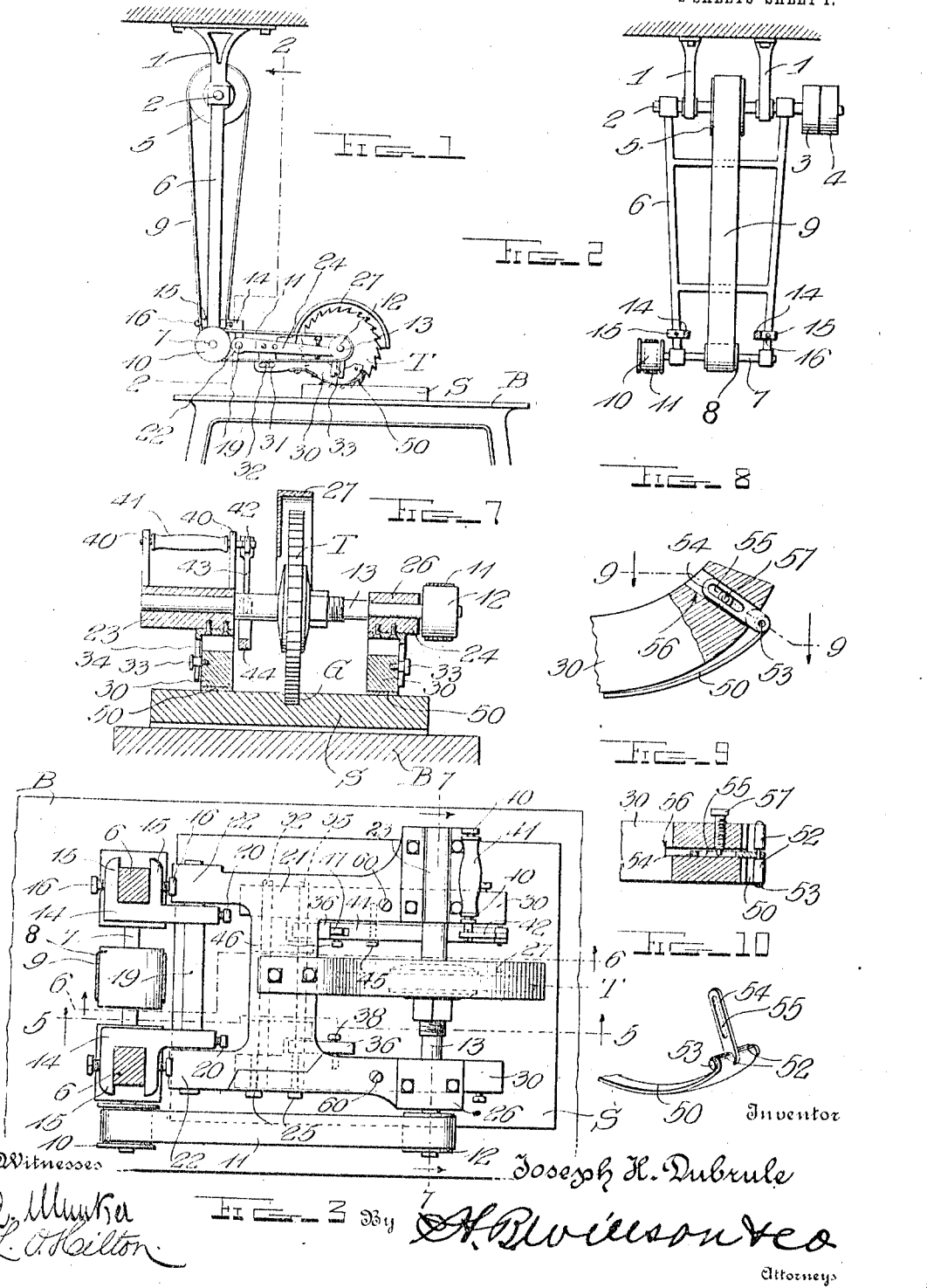

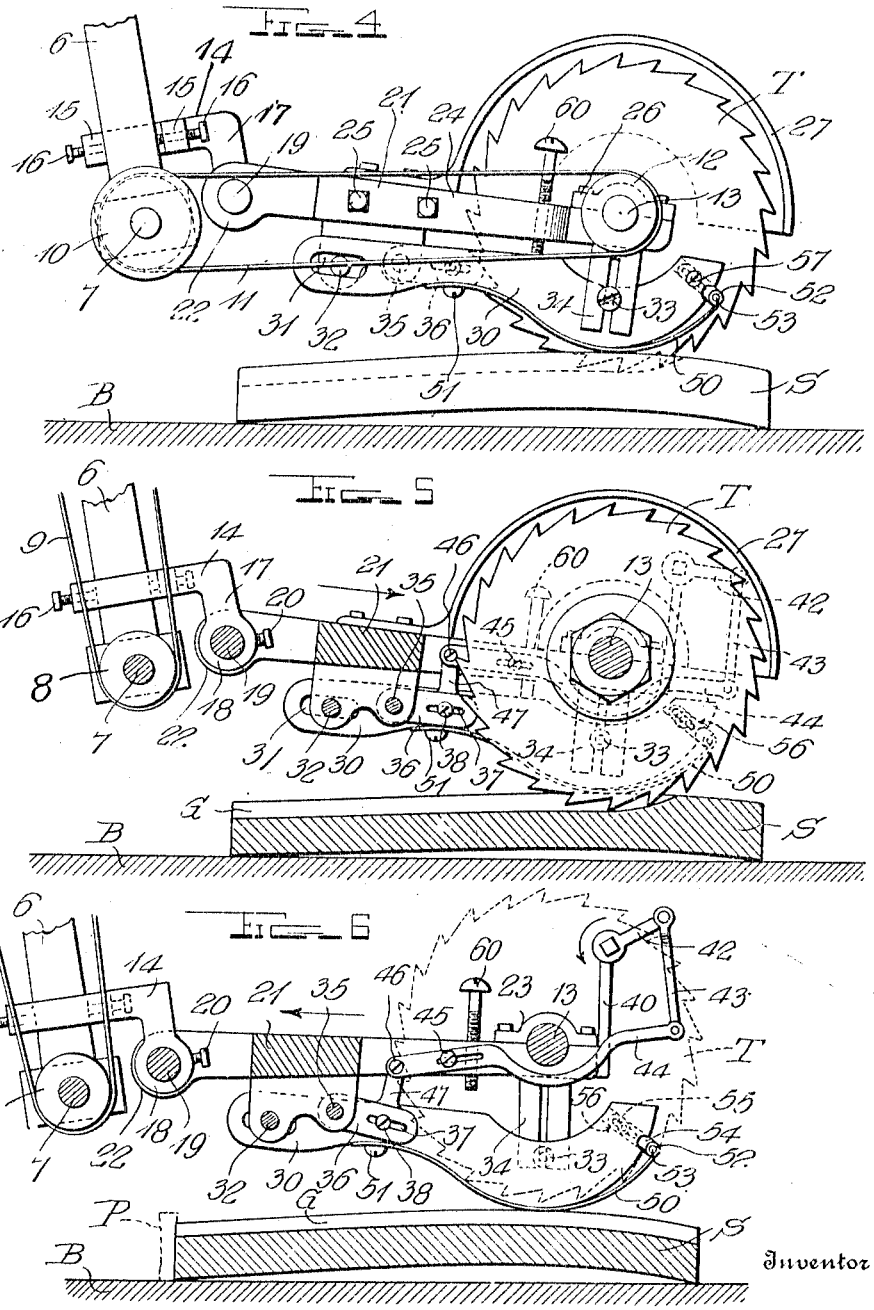

JOSEPH H. DUBRULE, OF EAST HARTFORD, CONNECTICUT.

DADO-MACHINE.

1,096,611.  Specification of Letters Patent.  Patented May 12, 1914.

Application filed September 22, 1913. Serial No. 791,194.

*To all whom it may concern:*

Be it known that I, JOSEPH H. DUBRULE, a citizen of the United States, residing at East Hartford, in the county of Hartford and State of Connecticut, have invented certain new and useful Improvements in Dado-Machines; and I do declare the following to be a full, clear, and exact description of the invention, such as will enable others skilled in the art to which it appertains to make and use the same.

This invention relates to woodworking, and more especially to gaining or routing; and the object of the same is to produce a machine which will cut a groove across a piece of work which may be slightly arched or dished, but the groove will be of the same depth and cross section throughout its length.

This and other objects are accomplished by constructing the machine in the manner hereinafter more fully described and claimed, and as shown in the drawings wherein—

Figure 1 is a side elevation of the machine complete, and Fig. 2 is a section on the line 2—2 of Fig. 1; Fig. 3 is a plan view; Fig. 4 is an enlarged side elevation of the lower portion of the machine, and Figs. 5 and 6 are sections on the lines 5—5 and 6—6 respectively of Fig. 3, showing the parts in slightly different position. Fig. 7 is a cross section on the line 7—7 of Fig. 3; Fig. 8 is an enlarged sectional detail of the forward end of the runner, and Fig. 9 is a transverse section on the line 9—9 of Fig. 8; Fig. 10 is a detail perspective view of the forward end of the runner.

Mounted in overhead hangers 1 is a shaft 2 carrying fast and loose pulleys 3 and 4 by means of which it may be connected with a source of power, and between the hangers the shaft carries a drive pulley 5. Pivotally mounted on the shaft 2 is a swinging frame 6 having bearings at its lower end in which is journaled a driven shaft 7 carrying a pulley 8 which is belted as at 9 to the drive pulley 5, and one end of this shaft carries another pulley 10 which is belted as at 11 to a pulley 12 on the shaft or arbor 13 that carries the tool T. In the present case I have shown this tool as a circular saw of considerable thickness so that the cutting edges of its teeth are quite wide and a rather wide groove G will be produced in the stock S, but I do not wish to be limited to the tool employed as of course it will be changed when the groove G is to be wider or narrower or of different shape.

In order to permit the tool to be changed, mechanism is provided as will be explained below. L-shaped brackets 14 have their feet 15 adjustably mounted on the side bars or arms of the swinging frame 6 by means of set screws 16 or otherwise, while the pendent arms 17 of these brackets have eyes 18 at their lower ends in which is removably mounted a rod 19 held in place by means of set screws 20, and on the ends of this rod is mounted what might be called the "head" of the machine which is an H-shaped structure 21 having bearings or eyes 22 loosely embracing said rod as best seen in Fig. 3 and a single bearing 23 at the forward end of one of its arms in which is journaled one end of the arbor 13. The other arm 24 is removably connected with the body of the head by means of set screws 25, and this arm has another bearing 26 through which the arbor 13 passes; and the obvious function of this detail of construction is to permit the removal of the arm 24 so that the arbor can be withdrawn and replaced by another, or, when the arbor is out of position, the tool T can be replaced by another in a manner well understood by those familiar with this art. It will be noted from Fig. 5 that the rod 19 stands normally forward of the driven or counter shaft 7, so that an adjustment of the brackets 14 up and down on the side bars of the swinging frame 6 does not destroy the tension on the belt 11 connecting this counter shaft with the arbor 13 and yet when it is necessary to replace the tool T with one of considerable size it is possible to replace the belt 11 by another which will have the proper tension although the entire head be mounted higher up on the swinging frame 6. The obvious purpose is to have rotary movement communicated from the power shaft 5 to the arbor 13 and the tool T, so that when the latter is moved over the stock S the groove G will be cut in the same and the shape and size of this groove will correspond with the cutting face of the tool and the depth to which it is permitted to cut. A guard 27 preferably overlies the tool to keep sawdust out of the face of the operator who stands in front of the machine which would be to the right of it as illustrated in Figs. 1, 3, 4, 5, and 6.

Other details well known in the art may be applied without departing from the principle of my invention, such as belt tighteners, oil cups, and the various adjustments and refinements with which these machines are supplied.

The principal feature of my invention may be said to lie in the gage for regulating the depth to which the groove shall be cut in the stock, so that no matter if said stock is arched or dished the groove will be of the same depth from its upper face. Broadly speaking this gage consists of a pair of runners whose rear ends are hingedly or pivotally supported beneath the head and whose forward ends curve downward and carry adjustable shoes, means whereby the operator may adjust the position of said runners as he desires the depth of the groove increased, and means whereby the shoes themselves may be adjusted to a different arc if the stock S have considerable width as will be explained below. In the preferred embodiment of my invention, each runner 30 has a slot 31 at its rear end loosely mounted on a cross rod 32 carried by and beneath the head, while the forward end of the runner has a stud 33 movable in an upright slot in a guide 34 depending from the head beneath the arbor 13. Journaled in bearings beneath the head is a rock shaft 35 having arms 36 at its extremities projecting forward and slotted as at 37 to loosely engage studs 38 on the inner side of the runners, and it follows that when this rock shaft 35 is turned the front ends of the runners will be raised or lowered, their forward studs 33 rising and falling in the slotted guides 34 while their slotted rear ends 31 move slightly over the cross rod 32.

While any suitable means may be provided for manually rocking the shaft 35 as the necessities of the case may demand, I preferably make use of the following mechanism: Mounted in bearings 40 upstanding from the forward end of one of the arms of the H-shaped head 21 and preferably above its fixed bearing 23, is an oscillating handle 41 from whose shaft an arm 42 projects forward, and the front end of this arm is connected by a link 43 with the forward end of a lever 44 whose body is bent as best seen in Fig. 6 so as to pass under the arbor 13, is pivoted at 45 to the head 21, and is pivotally connected at its rear end at 46 with a link 47 which leads downward and connects with one of the arms 36 on the rock shaft 35. The construction is such that when the handle 41 is turned in one direction the runners are raised, and when it is turned in the other direction they are depressed, and the direction is by preference such as is convenient to the hand of an operator standing in front of the machine as will be explained below.

One other detail of construction follows from the fact that if the stock S is quite wide and the movement of the tool T across it causes the head 21 to travel through a considerable arc with reference to the swinging frame 6, at either extreme of its movement when the head is supported by the runners near the forward or rearward ends of the curved portion of the latter, their distance from the axis of the arbor 13 may not be ever the same. In order, therefore to provide means for adjusting the curvature of the rounded or forward portions of the runners, I make use of a steel shoe 50 secured at its rear end to the point 51 beneath each runner and having its body bent downward under the curved portion of said runner and carried forward and upward as best seen in Figs. 4 and 6, and the front end of this shoe is rendered adjustable by the detailed construction best seen in Figs. 8, 9, and 10. That is to say, the front end of the shoe is forked or bifurcated and provided with a pair of knuckles or eyes 52, and between these is pivoted on a pin 53 the lower end of a link 54 which has a longitudinal slot 55 in its body. Each link passes upward through a slot or opening 56 in the toe of the runner 30 and is rendered adjustable therein by means of a set screw 57 as best seen in Fig. 9. When the two set screws 57 are loosened it is obvious that the links may be adjusted upward and downward within the openings 56, and such adjustment causes a corresponding movement of both of the shoes so that the curvature thereof may be adjusted to suit the occasion. If a greater degree of adjustment is desired than is permitted by this construction, it is quite possible to entirely remove the runners and replace them by others whose lower faces are curved to a greater or lesser degree and also preferably carry the shoes as described. This removal is effected by disconnecting the hand-operating mechanism, knocking out the cross rod 32, and replacing the runners and restoring said rod in a manner which will be clear. In order to limit the rise of the runners (which would permit the descent of the cutting tool T), no matter how the operating handle 41 may be turned in an effort to raise them, I preferably provide the head with a pair of set screws 60 which pass downward through its arms with its lower extremities disposed above the runners as perhaps best seen in Fig. 4, and these set screws could be adjusted so that under no circumstances may the runners rise so high relatively to the head that the tool will cut too deep a groove in the stock. The parts are of the desired sizes, shapes, proportions, and materials, and changes in details may be made without departing from the principle of the invention.

In operation, the stock is laid on the workbench roughly indicated at B in Figs. 4, 5, and 6, while the machine hangs above the rear portion of the bench and the operator stands in front of it. Throwing on the power by mechanism not necessary to detail, rotary movement is imparted to the tool whose cutting edge or active face at this time is held above the stock and the bench by the depressed condition of the runners. Taking the handle 41 in his right hand, the operator now has his left hand free to hold the stock against a suitable stop roughly indicated in Fig. 6 in the shape of a plug P, and the entire head of the tool is moved forward and backward over the stock by pulling and pushing on said handle, while the cutting face of the tool is permitted to descend and act on the upper face of the stock by the rotary adjustment of said handle in a manner already described. To be more specific, the natural tendency of the workman as he pushes the tool to the rear is to rotate the handle 41 in the direction of the arrow shown in Fig. 6, and through the connections between this handle and the runners it will be seen that the latter are depressed by such rotation of the handle so that he may slide the shoes 50 over the upper face of the stock (on which they of course rest at either side of the groove G) without the teeth of the tool touching the stock at all. When he has pushed the tool to the rear, a reverse movement of the handle raises the runners and permits the tool T to descend, and the groove G is cut. This may be accomplished by one movement of the tool across the stock or by repeated movements if desired, and I do not wish to be limited in this respect. Moreover, I have shown the teeth of the tool as disposed in a certain direction, but I do not wish to be limited in that respect nor in other details further than as set forth in the claims below. Having finished this piece of work, the tool may be pushed to the rear beyond the stock and a new piece put in place. If the groove in that piece is to be different, the arm 24 will be detached from the head 21 and the arbor 13 with its tool withdrawn from place, a new tool mounted thereon, and the parts replaced in a manner well known to those skilled in this art.

What is claimed as new is:

1. The combination with an overhead drive shaft having a pulley, a swinging frame hung on said shaft, a counter shaft journaled through the lower end of said frame and having a pulley, and a belt connecting said pulleys; of a head, a tool-arbor journaled therein and having a pulley, a second pulley on the counter shaft, a belt connecting it with that on said arbor, a rod across the head forward of said counter shaft, L-shaped brackets having eyes mounted on said rod and feet embracing the side arms of said swinging frame, and means for permitting the attachment of the feet to said arms in various positions.

2. The combination with an overhead drive shaft having a pulley, a swinging frame hung on said shaft, a counter shaft journaled through the lower end of said frame and having a pulley, and a belt connecting said pulleys; of a head, a tool-arbor journaled therein, connections between said counter-shaft and arbor, said head being of H-shaped construction with eyes in its rearmost arms, a cross rod mounted in said eyes, a pair of L-shaped brackets having eyes at their forward ends mounted on said rod and a pair of feet at their rearward ends mounted astride the upright arms of said frame, and set screws through said feet against said arms.

3. The combination with a swinging frame mounted in overhead hangers, a substantially horizontal head, a tool whose arbor is journaled in the head, and connections between said arbor and an overhead source of power; of brackets at the rear end of said head and adjustable vertically on said frame, a runner having a curved lower face below the head and opposite said tool, means for adjusting the position of said runner, a shoe beneath said face, and means for adjusting the curvature of the shoe.

4. The combination with a swinging frame mounted in overhead hangers, a substantially horizontal head, a tool whose arbor is journaled in the head, and connections between said arbor and a source of power; of means for supporting the rear end of the head from said frame, a runner pivotally connected at its rear end with the head and standing below the same alongside the tool, a shoe carried by the lower face of said runner, and means for adjusting the curvature of said shoe.

5. The combination with a swinging frame, a substantially horizontal head carried thereby, a tool whose arbor is journaled in the head, and means for driving said arbor from a source of power; of a pair of runners hingedly connected at their rear ends with said head and standing below the same, their forward ends standing on opposite sides of said tool and being curved on their lower faces, manually controlled mechanism for swinging said runners around their hinges, a curved shoe beneath the curved portion of each runner, and means for adjusting the curvature of said shoe.

6. The combination with a substantially H-shaped head, means for supporting its rear end, adjustable means for supporting its rear end at different heights, a tool whose arbor is journaled through the forward arms of said head, and means for rotating said arbor; of a pair of runners hingedly connected at their rear ends with said head and standing below the same, their forward ends standing on opposite sides of said tool and being curved on their lower faces, manually controlled mechanism for swinging said runners around their hinges, a curved shoe beneath the curved portion of each runner, and means for adjusting the curvature of said shoe.

7. The combination with a substantially H-shaped head, adjustable means for supporting its rear end, a tool whose arbor is journaled through the forward arms of said head, and means for rotating said arbor; of a runner connected with the head and standing below the same alongside the tool, a shoe carried by the lower face of said runner, and means for adjusting the curvature of said shoe.

8. The combination with a substantially H-shaped head, means for supporting its rear end, a tool whose arbor is journaled through the forward arms of said head, and means for rotating said arbor; of a pair of slotted guides depending from the forward arms of said head, a cross rod beneath the head, a pair of runners having their rear ends slotted and mounted on said rod and their forward ends curved downward, studs in said forward ends loosely engaging the slots in said guides, and means for raising and lowering said forward ends.

9. The combination with a substantially H-shaped head, means for supporting its rear end, a tool whose arbor is journaled through the forward arms of said head, and means for rotating said arbor; of a pair of slotted guides depending from the forward arms of said head, a cross rod beneath the head, a pair of runners having their rear ends slotted and mounted on said rod and their forward ends curved downward, studs in said forward ends loosely engaging the slots in said guides, an oscillating handle mounted on said head, a rock shaft having slotted arms projecting from it, studs in said shoes loosely engaging these slots, and connections between said rock shaft and handle.

10. The combination with a substantially H-shaped head, means for supporting its rear end, and a tool whose arbor is journaled through the forward arms of said head; of a pair of slotted guides depending from the forward arms of said head, a pair of runners having their rear ends hingedly supported by the head and their forward ends curved downward, studs in said forward ends loosely engaging the slots in said guides, an oscillating handle mounted on said head, a rock shaft having slotted arms projecting from it, studs in said shoes loosely engaging these slots, an arm projecting from the shaft of said handle, a lever pivoted between its ends within said head and having its forward portion passing under the arbor, a link connecting its front end with said arm on the handle, and a link connecting its rear end with one of the arms on said rock shaft.

11. In a machine of the class described, the combination with a substantially horizontal head having forwardly projecting arms, means for supporting its rear end and permitting the head to move forward and backward, a cross rod beneath the head, and a tool whose arbor is journaled through said arms; of a pair of slotted guides depending from said arms, a pair of runners having their rear ends slotted and mounted on said rod and their forward ends curved downward, studs in the runners loosely engaging the slots in said guides, shoes beneath said forward ends, and means for raising and lowering said forward ends.

12. In a machine of the class described, the combination with a substantially horizontal head having forwardly projecting arms, means for supporting its rear end and permitting the head to move forward and backward, and a tool whose arbor is journaled through said arms; of a pair of slotted guides depending from said head, a cross rod beneath the head, a pair of runners having their ends slotted and mounted on said rod and their other ends curved downward, studs in said curved ends loosely engaging the slots in said guides, an oscillating handle mounted on said head, a rock shaft having slotted arms projecting from it, studs in said shoes loosely engaging these slots, and connections between said rock shaft and handle.

13. In a machine of the class described, the combination with a substantially horizontal head having forwardly projecting arms, means for supporting the rear end of the head and permitting the head to move forward and backward, a tool whose arbor is journaled through said arms, and means for rotating said arbor; of a pair of slotted guides depending from the forward arms of said head, a cross rod beneath the head, a pair of runners having their rear ends slotted and mounted on said rod and their forward ends curved downward, studs in said forward ends loosely engaging the slots in said guides, shoes beneath said forward ends, an oscillating handle mounted on said head, a rock shaft having slotted arms projecting from it, studs in said shoes loosely engaging these slots, an arm projecting from the shaft of said handle, a lever pivoted between its ends within said head and having its forward portion passing under the arbor, a link connecting its front end with said arm on the handle, and a link connecting the rear end of said lever with one of the arms on said rock shaft.

14. A depth gage for wood working machines comprising a runner adapted to be hingedly connected at one end with and to stand beneath the tool-carrying head, its opposite end being curved downward on a line opposite said tool, means for permitting the vertical adjustment of this end, a shoe secured at its rear end beneath said runner and with its body underlying the curved portion thereof, and means for adjusting the position of its front end with respect to the front end of the runner.

15. A depth gage for wood working machines comprising a runner adapted to be hingedly connected at one end with and to stand beneath the tool-carrying head, its opposite end being curved downward on a line opposite said tool, means for adjusting this end vertically, a shoe secured at its rear end beneath said runner and with its body underlying the curved portion thereof, the front end of the shoe having a pair of eyes, a link pivoted at its lower end between said eyes and having a slotted body, the runner having an opening through which said body passes, and a transverse set screw in the runner intersecting said opening and engaging the slot in said link.

In testimony whereof I have hereunto set my hand in presence of two subscribing witnesses.

JOSEPH H. DUBRULE.

Witnesses:
JAMES E. SCHRIDER,
J. A. GRIESBAUER.